E. SMITH.
GATE.
APPLICATION FILED AUG. 31, 1917.
1,257,137.
Patented Feb. 19, 1918.
2 SHEETS—SHEET 1.
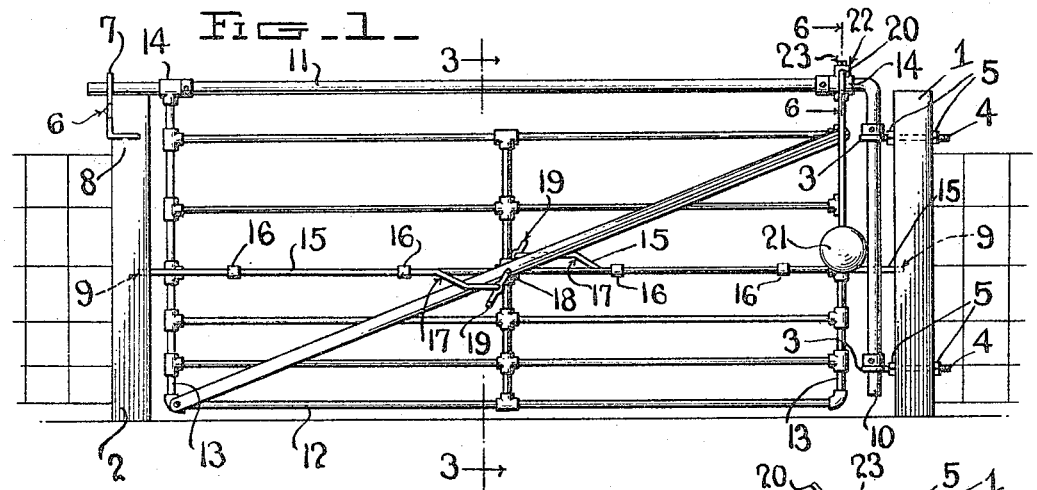
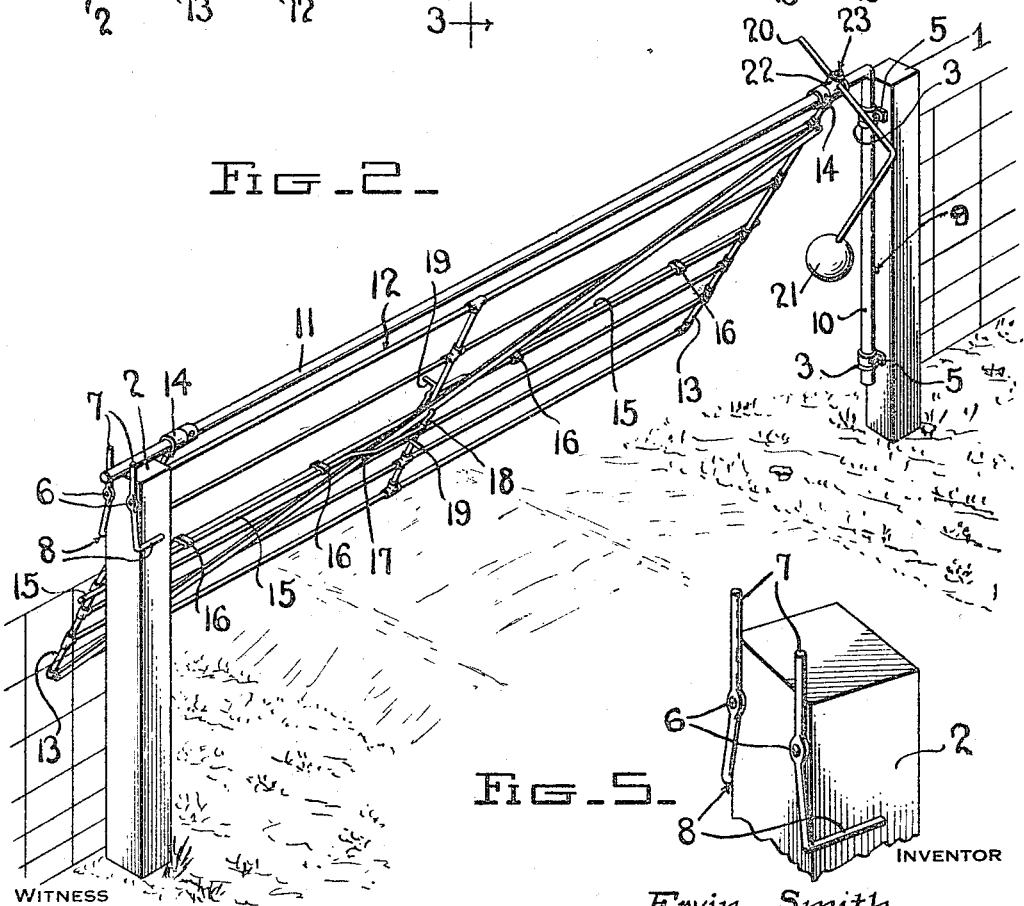
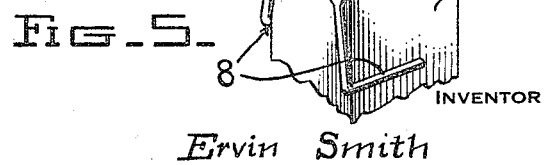
WITNESS
L. B. James
INVENTOR
Ervin Smith
BY Victor J. Evans
ATTORNEY E. SMITH.
GATE.
APPLICATION FILED AUG. 31, 1917.
1,257,137.
Patented Feb. 19, 1918.
2 SHEETS—SHEET 2.
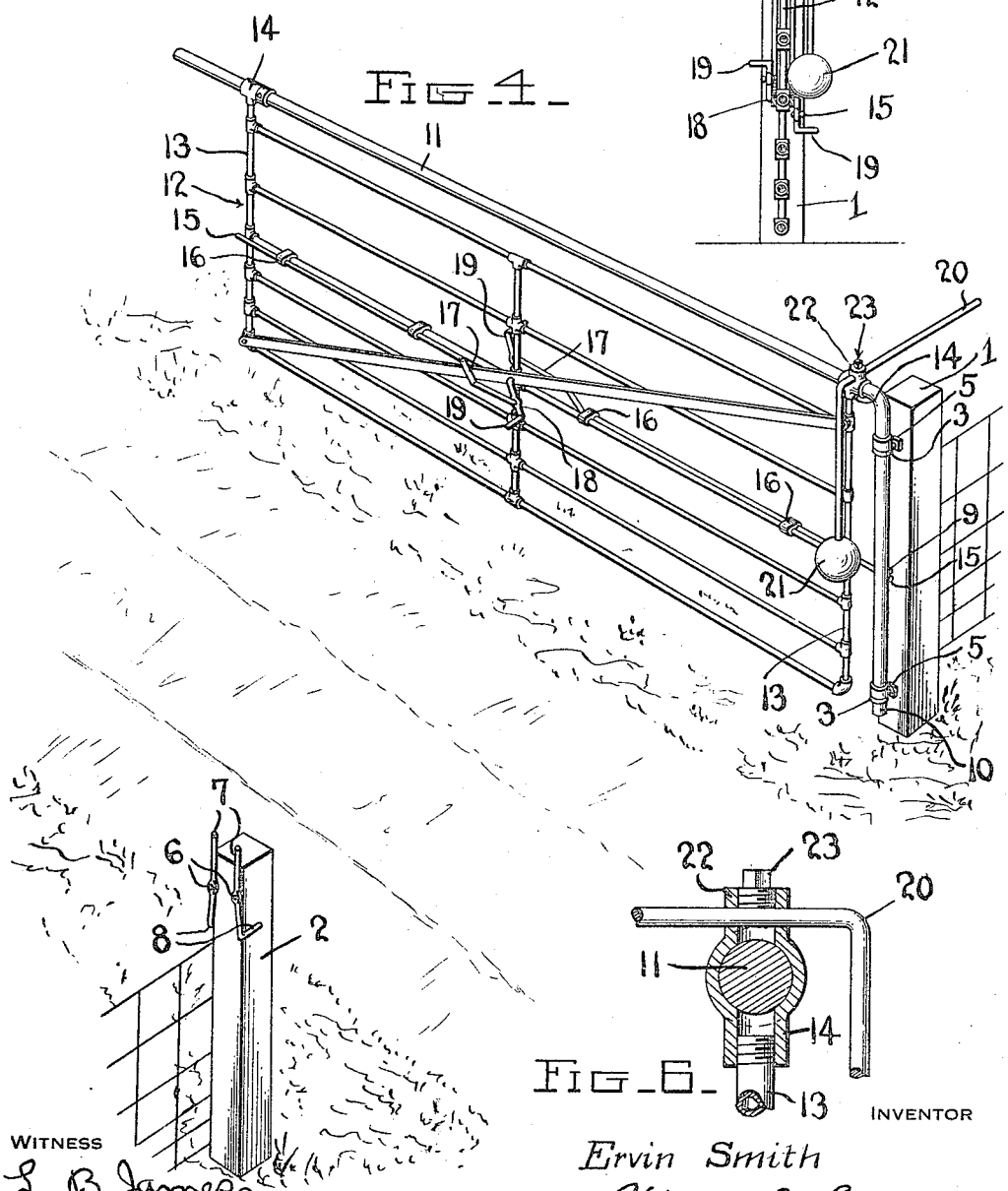
INVENTOR
Ervin Smith
BY Victor J. Evans
ATTORNEY
WITNESS
L. B. James

UNITED STATES PATENT OFFICE.

ERVIN SMITH, OF APPLETON, WISCONSIN.

GATE.

1,257,137.     Specification of Letters Patent.     Patented Feb. 19, 1918.

Application filed August 31, 1917. Serial No. 189,188.

*To all whom it may concern:*

Be it known that I, ERVIN SMITH, a citizen of the United States, residing at Appleton, in the county of Outagamie and State of Wisconsin, have invented new and useful Improvements in Gates, of which the following is a specification.

The present invention relates to improvements in the construction of gates.

In carrying out my invention it is my purpose to construct a gate, primarily adapted for use on the fences of farms which, in addition to being easily actuated for swinging the same to either an open or closed position, may be readily retained at a desired inclination whereby to provide a passageway for poultry or small stock through the gateway, or whereby to elevate the lower end of the gate to provide a clearance for the same, when the same is positioned adjacent uneven ground surfaces or in wintry weather above snow banks, and whereby the operation of the gates will not be impeded under any conditions.

It is a further object of the invention to produce a gate which can be easily and cheaply manufactured, readily mounted upon the gate post, strong and durable and thoroughly effective in operation.

With the above and other objects in view the improvement resides in the construction, combination and arrangement of parts set forth in the following specification and falling within the scope of the appended claims.

In the drawings:

Figure 1 is a front elevation of the gate constructed in accordance with the present invention, Fig. 2 is a perspective view illustrating the gate swung upon its supporting shaft angularly with respect thereto and to the gate posts, to provide an entrance through the gateway for poultry, small animals, etc., or when the gate is arranged to swing over an embankment, Fig. 3 is a sectional view approximately on the line 3—3 of Fig. 1, Fig. 4 is a perspective view illustrating the gate swung to its open position, Fig. 5 is a detail enlarged perspective view of the abutment post illustrating the arrangement of the catch members at the top thereof, and Fig. 6 is a detail sectional view approximately on the line 6—6 of Fig. 1.

Referring now to the drawings in detail the numeral 1 designates the hinge or supporting post for the gate and 2 the abutment post therefor. The supporting post 1, upon its inner face, is provided with eye members 3, the same being preferably provided with threaded shanks 4 which are engaged by nuts 5 that contact with the inner face of the post 1, and if desired also with the outer face of the said post. By this arrangement it will be noted that the eye members may be adjusted longitudinally and retained in such adjusted condition. Upon the top of the abutment post adjacent the diametrically opposite corners thereof are pivotally secured, as at 6, two stop or catch members 7—7. Each of these members has one of its ends extending beyond its pivot a suitable distance over the top of the post 2 and its opposite end projecting a suitable distance downward of its pivot and provided with an offset or angular portion 8, the same providing a handle whereby the tops may be swung upon their pivots and also providing abutment elements which contact with the opposite sides of the post. In addition to this the angular or handle members 8 provide an additional weight to the lower ends of the stop members 7, so that the upper ends of the said stops are normally retained vertically with respect to the post 2. The post 2, at the center thereof, is formed with an aperture or socket 9 and the purpose of which will presently be apparent. Received in the eye members 3 is the vertical member or end 10 of a shaft 11, the said shaft being so disposed that the same will normally overlie the top of the abutment post 2, and be engaged between the stop members 7, so that it is necessary to swing one of the stops before the shaft can be swung in either direction with respect to the supporting and abutment posts 1 and 2.

The gate is broadly indicated by the numeral 12 and may be of any desired or preferred construction, that disclosed by the drawings being in the nature of connected pipe sections which are so braced as to provide a strong but light construction. The gate includes end members 13—13 which have their upper ends provided with T-sockets 14, and these sockets receive the horizontal member of the shaft. Suitable means are provided between the sockets and the shaft 11 for retaining the said gate against longitudinal or sliding movement upon the shaft.

The latch member is indicated by the numeral 15, and preferably comprises a rod mounted for slidable movement in suitable bearings 16 in one of the horizontal or longitudinal elements of the gate 12, the said latch bar having one of its ends terminating approximately central of the gate and the said end is offset, as at 17, and may be bent to provide an eye which engages in an aperture in the angular end of a crank member 18, the said crank being provided with an operating handle 19, and being journaled in a suitable bearing opening in the gate 12. By operating the handle 19 the crank may be moved to slide the latch bolt 15 longitudinally with respect to the gate to bring the end thereof within the socket 9, when the gate is to be locked to the abutment post, or out of the said socket when the gate is to be swung to its open position. In the drawings, I have illustrated two latch members 15, and both of the posts 1 and 2 provided with sockets 9 to receive the ends of the slidable latches. By this means, the gate is locked to both of the posts when in closed position, but it is obvious that, if desired, the latch member engaging with the post 1 may be dispensed with.

It will be noted that the gate is hingedly suspended from the shaft 11 and to normally retain the same vertically with respect to the offset end 10 of the said shaft 11, I arrange upon the end post 13 of the gate, nearest the supporting post 1 of the fence, weighted means, comprising an adjustable rod or arm 20 having its end offset and provided with a weight 21. The rod 20 passes through a suitable bearing 22, and the numeral 23 designates an adjustable element, such as a set screw, that is threaded in the said bearing and contacts with the rod 20 whereby the weight may be moved toward or away from the gate and retained in such position. When the weight is moved next to the post 13 the gate is sustained in its normally vertical position with respect to the angular end 10 of the shaft 11, but when the same is moved outwardly, the gate is swung upon its hinged connection with the said shaft 11 so that the same may be arranged angularly of the element 10 of the shaft and angularly with respect to the posts 1 and 2, and the angle of inclination of the said gate may be thus readily provided for. By this construction it will be noted that the gate may be swung at any desired angle, in accordance with the nature and size of fowls and animals permissibly entering the fields divided by the fence provided with the gate, and also that the arrangement permits of the gate being swung over an embankment, such as an irregularity in the roadway, snow banks, etc.

It will be further noted that by an adjustment of the eye members 3 the angular shaft may be properly adjusted to true the gate with respect to the gate posts, and the said shaft. The stop members 7 are disposed a considerable distance away from each other so that the same may be readily turned to permit of the swinging of the gate.

Having thus described the invention, what I claim is:

1. In a device for the purpose set forth, two spaced posts, a shaft overlying one of the posts and having an angular end journaled upon the other post, pivoted stop members upon the first mentioned post disposed to the opposite sides of the shaft, and a gate hung upon the said shafts between the posts.

2. In a gate construction, two spaced posts, eye members upon one of the posts, a shaft having an angular end which is received in the eye members, and the outer end of the said shaft being normally disposed over the second post, centrally pivoted stop members upon the said second post disposed upon opposite sides of the shaft, said stops having their lower ends formed with offset ends which normally contact with the outer sides of the said second post, a gate member hingedly connected with the shaft, and latching means between the gate member and the first mentioned post.

3. In a farm gate, two spaced posts, adjustable eye members upon one of the posts, a shaft having an angular end received in the eyes, and having its opposite end disposed over the second post, centrally pivoted stop members upon the opposite faces of the second post extending thereabove and disposed upon opposite sides of the shaft, weighted handle members upon the lower ends of the stops normally contacting with the sides of the said second post, a gate suspended from the shaft, weighted means for permitting the swinging of the gate upon the shaft, and latching means between the gate and one of the posts.

4. In a farm gate, a supporting post and an abutment post, adjustable eye members upon the supporting post, centrally pivoted stop members upon the opposite faces of the abutment post and projecting above the said post, said stop members having their lower ends formed with offset handles normally contacting with the opposite sides of the abutment post, and said abutment post having a socket, a shaft normally disposed above the abutment post and arranged between the stop members thereon, said shaft having an angular end journaled in the eyes of the supporting post, a gate pivotally suspended from the shaft between the posts, means for preventing the longitudinal movement of the gate upon the shaft, a slidable latch upon the gate designed to engage in the socket of the abutment post, and a longitudinally adjustable weighted element associated with the gate, as and for the purpose set forth.

In testimony whereof I affix my signature.

ERVIN SMITH.

Copies of this patent may be obtained for five cents each, by addressing the "Commissioner of Patents, Washington, D. C."